(12) United States Patent
White et al.

(10) Patent No.: US 7,243,880 B2
(45) Date of Patent: Jul. 17, 2007

(54) LANDING GEAR DOOR ASSEMBLY

(75) Inventors: Nicholas John White, Portishead (GB); Stephen Paul Briancourt, Bristol (GB)

(73) Assignee: Airbus UK Limited, Bristol (GB)

( * ) Notice: Subject to any disclaimer, the term of this patent is extended or adjusted under 35 U.S.C. 154(b) by 0 days.

(21) Appl. No.: 10/518,657

(22) PCT Filed: Jun. 18, 2003

(86) PCT No.: PCT/GB03/02614

§ 371 (c)(1),
(2), (4) Date: Dec. 16, 2004

(87) PCT Pub. No.: WO04/000502

PCT Pub. Date: Dec. 31, 2003

(65) Prior Publication Data

US 2005/0230549 A1    Oct. 20, 2005

(30) Foreign Application Priority Data

Jun. 19, 2002   (GB)   ................................. 0214119.0

(51) Int. Cl.
*B64C 1/14* (2006.01)
(52) U.S. Cl. .............................. 244/129.5; 244/129.4; 244/102 R
(58) Field of Classification Search ............ 244/100 R, 244/102 R, 102 A, 129.1, 129.4, 129.5, 118.3, 244/137.1, 137.2, 137.4, 119, 137.3
See application file for complete search history.

(56) References Cited

U.S. PATENT DOCUMENTS

| | | | | | |
|---|---|---|---|---|---|
| 2,014,793 | A | * | 9/1935 | Weymouth et al. | 244/102 R |
| 2,071,594 | A | * | 2/1937 | Trimbach | 89/1.59 |
| 2,129,824 | A | * | 9/1938 | De Seversky | 244/102 R |
| 2,180,462 | A | * | 11/1939 | De Seversky | 244/102 R |
| 2,338,046 | A | * | 12/1943 | Lloyd | 244/102 R |
| 2,362,361 | A | * | 11/1944 | Davis | 89/1.54 |
| 2,362,919 | A | * | 11/1944 | Miller | 244/102 R |
| 2,388,365 | A | * | 11/1945 | Nevin | 244/102 R |
| 2,406,710 | A | * | 8/1946 | Ramey et al. | 244/102 R |
| 2,431,093 | A | * | 11/1947 | Trich | 244/102 R |

(Continued)

FOREIGN PATENT DOCUMENTS

EP    1 129 938 A1    9/2001

(Continued)

OTHER PUBLICATIONS

Great Britain Search Report.

(Continued)

*Primary Examiner*—Robert P. Swiatek
*Assistant Examiner*—Stephen A Holzen
(74) *Attorney, Agent, or Firm*—Patterson, Thuente, Skaar & Christensen, P.A.

(57) ABSTRACT

An aircraft landing gear door assembly includes a plurality of doors moveable between open positions, in which landing gear can be deployed through an aperture, and closed positions, in which the doors are closed across the aperture. The plurality of doors includes first and second doors arranged such that, when the landing gear is deployed, the second door is obstructed from moving between its open and closed positions while the first door is free to move between its open and closed positions. After the landing gear is deployed the first door is closed.

20 Claims, 5 Drawing Sheets

U.S. PATENT DOCUMENTS

| | | | |
|---|---|---|---|
| 2,452,251 A | 10/1948 | Martin | |
| 2,483,027 A * | 9/1949 | Hill et al. | 244/102 R |
| 2,548,832 A | 4/1951 | Tydon | |
| 2,552,843 A * | 5/1951 | Clifton et al. | 244/102 R |
| 2,670,156 A * | 2/1954 | Clark et al. | 244/63 |
| 2,731,221 A * | 1/1956 | Holton | 244/129.5 |
| 2,741,446 A * | 4/1956 | Jakimiuk | 244/102 R |
| 2,747,817 A * | 5/1956 | Saulnier | 244/50 |
| 2,750,134 A * | 6/1956 | Hawkins, Jr. et al. | 244/102 R |
| 2,869,806 A * | 1/1959 | Beach | 244/102 R |
| 2,921,759 A * | 1/1960 | Elkin et al. | 244/102 R |
| 2,941,756 A * | 6/1960 | Roberts | 244/102 R |
| 3,174,712 A * | 3/1965 | Ricard | 244/129.5 |
| 3,372,892 A | 3/1968 | May | |
| 3,656,164 A * | 4/1972 | Rempt | 343/705 |
| 4,412,665 A * | 11/1983 | Kramer et al. | 244/102 R |
| 4,593,288 A * | 6/1986 | Fitzpatrick | 343/705 |
| 4,674,712 A * | 6/1987 | Whitener et al. | 244/119 |
| 4,845,804 A * | 7/1989 | Garrett | 16/19 |
| 5,000,400 A * | 3/1991 | Stuhr | 244/102 R |
| 5,058,827 A * | 10/1991 | Dansereau et al. | 244/103 R |
| 5,482,228 A * | 1/1996 | Hoshino | 244/50 |
| 5,692,703 A * | 12/1997 | Murphy et al. | 244/102 R |
| 6,068,215 A * | 5/2000 | Gruensfelder et al. | 244/129.5 |
| 6,345,786 B1 * | 2/2002 | Sakurai | 244/102 R |
| 6,352,221 B1 * | 3/2002 | Sakurai | 244/102 R |
| 6,499,694 B2 * | 12/2002 | Roloff | 244/129.4 |
| 6,536,711 B1 * | 3/2003 | Conway et al. | 244/129.5 |
| 6,854,689 B1 * | 2/2005 | Lindahl et al. | 244/102 R |
| 2005/0103937 A1 * | 5/2005 | Briancourt | 244/129.5 |
| 2005/0194496 A1 * | 9/2005 | White | 244/129.4 |
| 2005/0211849 A1 * | 9/2005 | Rouyre | 244/129.4 |
| 2005/0230549 A1 * | 10/2005 | White et al. | 244/129.4 |
| 2006/0032981 A1 * | 2/2006 | Fort | 244/129.4 |
| 2006/0060707 A1 * | 3/2006 | Chow et al. | 244/129.4 |
| 2006/0157621 A1 * | 7/2006 | Santos et al. | 244/129.4 |

FOREIGN PATENT DOCUMENTS

| | | |
|---|---|---|
| GB | 537234 | 6/1941 |
| GB | 713258 | 8/1954 |
| GB | 756111 | 8/1956 |
| GB | 847382 | 9/1960 |
| WO | WO 01/56878 A1 | 8/2001 |

OTHER PUBLICATIONS

European Search Report.
PCT International Search Report.
"Farnborough International 94 The Official Programme", published 1994 (UK) Key Exhibitions Ltd.

* cited by examiner

LANDING GEAR DOOR ASSEMBLY

The present invention relates to an aircraft landing gear door assembly.

BACKGROUND OF THE INVENTION

A landing gear of an aircraft is typically moveable between a deployed position, where the landing gear extends downwardly from the aircraft and wheels of the landing gear can engage a runway, and a stored position where the landing gear is accommodated within appropriately shaped bays in the aircraft's fuselage or wing. So as not to interfere with the overall aerodynamic properties of the aircraft in flight, the bays are provided with doors which, when closed, conform to the shape of the aircraft body.

In a known landing gear door assembly, a pair of doors are provided. In the closed position of the doors the opening or aperture of the bay accommodating the landing gear is closed across by the doors with adjacent edges of the doors extending along a generally longitudinal axis spanning the aperture. Each door is hinged about a generally horizontal and longitudinal axis in the region of the edge of the door opposite to the edge adjoining the other door, allowing the doors to be rotated downwardly about the axes to open positions in which the doors extend approximately vertically downwardly from the aircraft body. It will be understood that references to the horizontal and vertical and the like, refer to a situation where the aircraft is at rest on a horizontal runway.

The size of the pair of doors depends upon the size of the aperture that the doors must close over and the aperture must in turn be sufficiently large to allow passage of the landing gear during deployment. As a result, if the landing gear is relatively large the doors must in turn be relatively large. Such large doors are, however, disadvantageous from an aerodynamic and noise viewpoint when they are open and extending downwardly and outwardly from the aircraft body.

SUMMARY OF THE INVENTION

It is an object of the invention to provide an aircraft landing gear door assembly that overcomes or mitigates the problem referred to above and in particular enables an aircraft to employ a door assembly that when open provides a relatively large aperture for deployment of landing gear without leading to a corresponding disadvantage from an aerodynamic and noise viewpoint.

According to the invention there is provided an aircraft landing gear door assembly including a plurality of doors moveable between open positions, in which landing gear can be deployed through an aperture, and closed positions, in which the doors are closed across the aperture, the plurality of doors including a first door and a second door, wherein the first and second doors are so arranged that they are, in use, configurable in such a way that movement of one of the first and second doors for at least a part of the way between the open and closed positions causes movement of the other of the first and second doors, and the first and second doors are arranged such that, when the landing gear is deployed, the second door is obstructed from moving between its open and closed positions while the first door is free to move between its open and closed positions.

By providing two doors, the first of which is free to move between its open and closed positions when the landing gear is deployed, it becomes possible to close the first door after deployment of the landing gear. It is then only the second door which is likely to have any adverse aerodynamic effect and/or generate noise.

Preferably, the first and second doors are mounted such that they may be moved together between the open and closed positions substantially without any relative movement between the first and second doors.

The movement, for which one of the first and second doors is mounted, may be constrained. For example, the movement may be such that there is only one degree of freedom when moving the door between the open position and the closed position. The movement of said one of the first and second doors may be constrained for substantially all of the movement between the open and closed positions. The movement of said other of the first and second doors may also be constrained. Preferably, the first and second doors are both mounted for movement, which is constrained.

One of the first and second doors is preferably mounted for rotational movement about a fixed axis. The first door is preferably mounted for rotational movement about an axis, which is preferably a fixed axis. Similarly the second door is preferably mounted for rotational movement about an axis, which is preferably a fixed axis. Whilst it is possible for a door to be mounted such that its movement is a complex combination of translational and rotational movements, fixed-axis rotation provides a simple and reliable design.

Preferably, the first and second doors are mounted for rotation about a fixed axis, the fixed axes of rotation of the first and second doors being substantially coincident.

It is possible to provide respective drives, for example, linear actuators, for each of the doors but it is also possible to provide a drive for the first door only and to move the second door by coupling it to the first door. Thus the first and second doors may be arranged to be coupled together to move as a single unit between their open and closed positions, and be decoupled to enable the first door also to move independently of the second door between its open and closed positions.

The assembly preferably includes locking devices for locking some or all of the doors in their closed and/or open positions. In the case where the first and second doors are capable of being coupled together, it is especially preferred to provide a locking device for locking the second door in its open position.

Preferably, when the doors are in their open positions, the second door is disposed below the first door. The second door is referred to as "below" the first door, if the major part of the second door is below the major part of the first door, even though there may be parts of the second door that are above parts of the first door. Preferably the second door is mounted on at least one arm which is connected at one end to the second door and is moveably mounted, preferably rotatably mounted, at its other end to allow the movement of the second door between its open and closed positions. Preferably two or three such arms are provided for each door. When the second door is in its open position and the landing gear is deployed, the second door is preferably disposed adjacent to the wheels of the landing gear.

Preferably, the first and second doors are each mounted for movement by means of a connection having a plurality of connection points, at least one of the connection points of one of the first and second doors being disposed between two of the connection points of the other of the first and second doors. In the case where the second door is mounted on two arms, the point at which each arm is mounted for movement may be considered as comprising a connection point for example. In that case, the points at which the first door is mounted for movement may for example include a connection that is disposed between the two points at which the two arms are movably mounted. Said connection may be in the form of a hinge mounted on a shaft or spindle. There may be an infinite number of notional connection points associated with each connection. The first and second doors are preferably mounted for rotation about the same hinge.

In a conventional door assembly it is common for a pair of doors to be provided. According to the invention the plurality of doors preferably includes a third door moveable between closed and open positions, the first and third doors defining a pair of doors on opposite sides of the aperture through which the landing gear is deployed. Like the first door, the third door is preferably mounted for rotational movement about an axis, which is preferably a fixed axis, and is preferably arranged such that, when the landing gear is deployed, it is free to move between its open and closed positions. When the doors are all closed, the second door is preferably disposed between the first and third doors; in one embodiment of the invention described below and employing three doors, the second door is disposed in the middle of the three doors and the arrangement is approximately symmetrical about a plane passing through the middle of the second door; in another embodiment of the invention described below a fourth door is provided, interacting with the third door in substantially the same way as the second door interacts with the first door, and the arrangement is approximately symmetrical about a plane passing through an interface of the second and fourth doors. Thus, the plurality of doors may include a fourth door mounted for movement between closed and open positions, the third and fourth doors being arranged such that, when the landing gear is deployed, the fourth door is obstructed from moving between its open and closed positions while the third door is free to move between its open and closed positions. It will be understood that, because the first and third doors are a pair, the third door may include any or substantially all of the features of the first door. Similarly, the fourth door, being one of the pair of doors including the second door, may include any or substantially all of the features of the first door. Thus, the third and fourth doors may incorporate any of the features described above in relation to the first and second doors.

Preferably, in the closed position, at least one of the plurality of doors is surrounded by other doors of the plurality of doors for at least 60% of its perimeter, preferably for at least 75% of its perimeter and more preferably for at least 90% of its perimeter. For example, where the doors include third and fourth doors as defined above, the majority of the perimeter, and preferably substantially the entire perimeter, of the second door is directly adjacent to one or more of the first, third and fourth doors. Similarly, the fourth door may be at least partially, and preferably substantially completely, surrounded by the first, second and third doors.

The first and second doors are preferably so shaped that, when closed, a significant portion of the perimeter of the second door is separated from the perimeter of the aperture by a significant portion of the first door. For example, at least 60%, preferably at least 75% and more preferably at least 90%, of the perimeter of the second door is separated from the perimeter of the aperture. The first and second doors, when mounted for rotation about substantially the same axis, are preferably so shaped that at least 60%, preferably at least 75% and more preferably at least 90%, of the perimeter of the aperture that is aligned with (or more preferably separated by an angle of less than 30% from) the axis of rotation, is not directly adjacent to the second door.

Advantageously, one of the third and fourth doors is mounted so that the third and fourth doors may be moved together for at least a part of the way between the open and closed positions substantially without any relative movement between the third and fourth doors.

Whilst, the landing gear door assembly of the present invention may be associated with a nose landing gear of an aircraft, the landing gear door assembly is preferably associated with a main landing gear. It will be understood that in this context the term main landing gear is a landing gear that sustains a significant share of the loads sustained by the landing gear of the aircraft during landing and would normally for that reason exclude the nose landing gear.

The invention further provides an aircraft including a landing gear door assembly according to the present invention and a landing gear with which the landing gear door assembly is associated.

The present invention also provides a method of operating a landing gear door assembly including a plurality of doors moveable between open positions, in which the doors provide an aperture through which landing gear can be deployed, and closed positions, in which the doors close over the aperture, wherein the plurality of doors include first and second doors and the method includes the following steps:

opening the first and second doors, the opening of the doors comprising a step in which the first and second doors are moved together, preferably substantially without any relative movement between the first and second doors, deploying the landing gear; and closing the first door while the landing gear is still deployed.

It will be understood that the method just described is typically carried out shortly prior to landing.

The method preferably further includes the following subsequent steps:

opening the first door;

retracting the landing gear; and closing the first and second doors.

The closing of the doors advantageously comprises a step in which the first and second doors are moved together, preferably substantially without any relative movement between the first and second doors.

It will be understood that those steps are typically carried out shortly after take off.

Similarly, the invention provides a method of operating a landing gear assembly including a plurality of doors moveable between open positions, in which the doors provide an aperture through which landing gear can be deployed, and closed positions, in which the doors close over the aperture, wherein the plurality of doors include first and second doors, the method including the following steps:

providing the door assembly with the landing gear deployed, the first door closed and the second door open;

opening the first door;

retracting the landing gear; and closing the first and second doors, the closing of the doors comprising a step in which the first and second doors are moved together, preferably substantially without any relative movement between the first and second doors.

In that case the method preferably further includes the following subsequent steps:

opening the first and second doors;

deploying the landing gear; and closing the first door while the landing gear is still deployed.

The opening of the doors advantageously comprises a step in which the first and second doors are moved together, preferably substantially without any relative movement between the first and second doors.

It will be understood that the method just described involves the same steps as that previously described but beginning with those steps that are typically carried out shortly after take off.

Advantageously, the step of moving the first and second doors together in either of the above methods may be performed by effecting movement of one of the doors and arranging for that movement to cause the other of the first and second doors to be moved.

The method is preferably carried out using a door assembly as described above. For example, the plurality of doors may include a third door moveable between closed and open positions, the first and third doors defining a pair of doors on opposite sides of the aperture through which the landing gear is deployed, the third door being opened when the first door is opened and closed when the first door is closed. Furthermore the plurality of doors may include a fourth door mounted for movement between closed and open positions, the fourth door being opened when the second door is opened and closed when the first door is closed. The method may include a step in which the third and fourth doors are moved together substantially without any movement between the third and fourth doors.

According to a further aspect of the present invention there is provided an aircraft landing gear door assembly including a plurality of doors moveable between open positions, in which landing gear can be deployed through an aperture, and closed positions, in which the doors are closed across the aperture, the plurality of doors including a first door and a second door, wherein the first and second doors are arranged such that, when the landing gear is deployed, the second door is obstructed from moving between its open and closed positions while the first door is free to move between its open and closed positions. One of the first and second doors may be mounted so that the first and second doors may be moved together as a unit for at least a part of the way between the open and closed positions. Preferably, the first and second doors are moveable together substantially without any relative movement between the first and second doors. The first and second doors are advantageously mounted for rotation about a common hinge axis. Other features described above with reference to the present invention may of course be incorporated into this aspect of the invention. For example, the first and second doors may each be mounted for movement by means of a hinge having a plurality of connection points to a hinge axis, at least one of the connection points of one of the first and second doors being disposed between two of the connection points of the other of the first and second doors.

DESCRIPTION OF THE FIGURES

By way of example certain embodiments of the invention will now be described with reference to the accompanying drawings, of which.

DETAILED DESCRIPTION OF THE INVENTION

It should be appreciated that the drawings are schematic and intended to aid understanding of the principles underlying the invention, rather than to provide full details of a particular design. In particular, for the following description it should be assumed that FIGS. 1 to 3 and 6 and 7 all relate to the same embodiment, despite the minor differences in the corresponding drawings.

Figure 1:
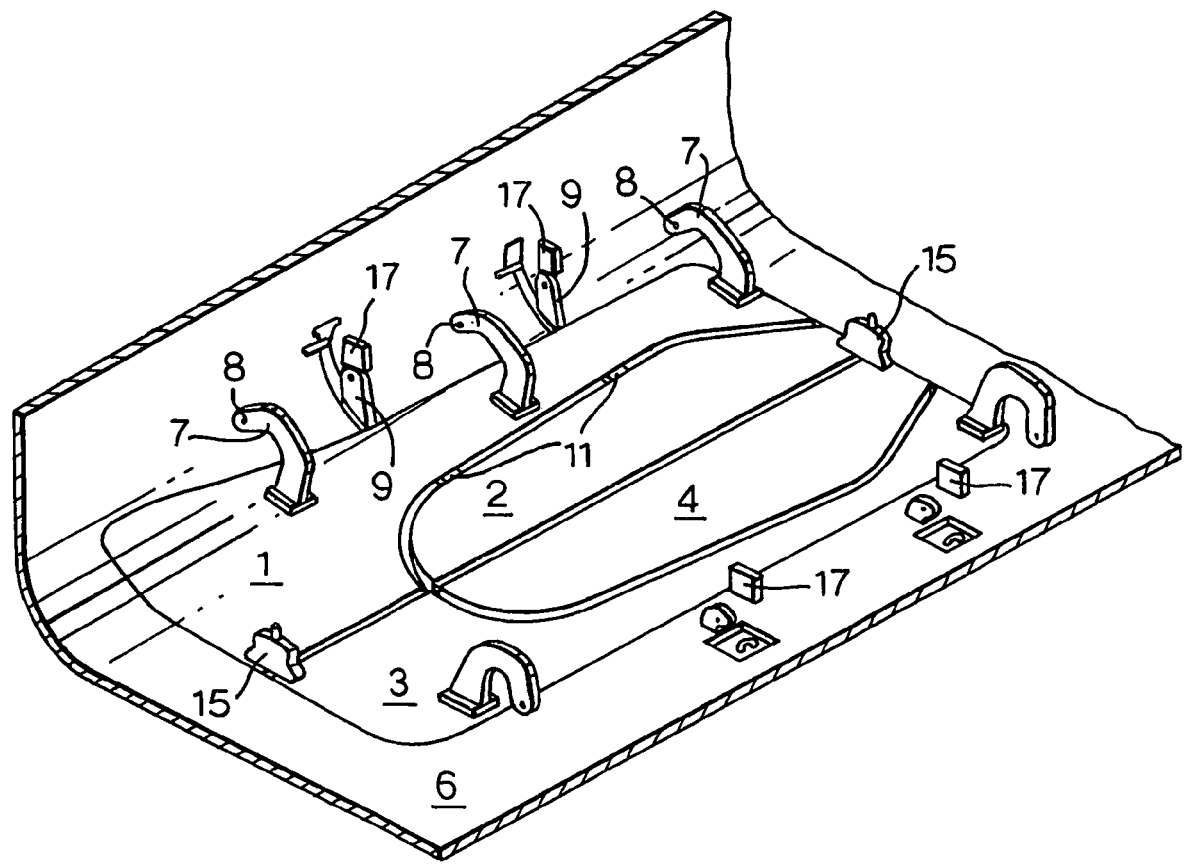
FIG. 1 is a perspective view from above of an aircraft landing gear door assembly with all the doors shown closed.

Referring first to FIG. 1, there is shown an aircraft landing gear door assembly including a first door 1, a second door 2, a third door 3 and a fourth door 4. The doors 1 to 4 are shown in their closed positions in FIG. 1 in which they are closed across an aperture 5 in an aircraft skin 6.

The door 1 is rotatably mounted on arms 7 for fixed-axis rotation, the ends of the axis 7 opposite the ends that are connected to the doors being connected at connections 8 to mountings (not shown) fixed to the aircraft structure. The door 2 is similarly rotatably mounted on arms 9 for fixed-axis rotation about connections 10. Thus the doors 1 and 2 are able to rotate downwardly from the closed positions shown in FIG. 1 through an angle of about 90 degrees to the open positions shown in FIG. 2.

The door 2 is connected to arms 11 which pass over the exterior of the door 1 and through openings in the aircraft skin 6. The ends of the arms 11 opposite to those connected to the door 2 are rotatably connected at connections 12 to mountings (not shown) fixed to the aircraft structure. As can be seen in FIG. 1, the door 2 is mounted for rotation about a fixed axis substantially coincident with the axis of rotation of the door 1. Similarly the door 4 is connected to arms 13 which pass over the exterior of the door 2 and through openings in the aircraft skin 6. The ends of the arms 13 are rotatably connected at connections 14 to mountings (not shown) fixed to the aircraft structure. As can be seen in FIG. 1, the door 4 is mounted for rotation about a fixed axis substantially coincident with the axis of rotation of the door 1. Thus the doors 3 and 4 are able to rotate downwardly from the closed positions shown in FIG. 1 through an angle of about 90 degrees to the open position shown in FIGS. 2 and 3.

Figure 6:
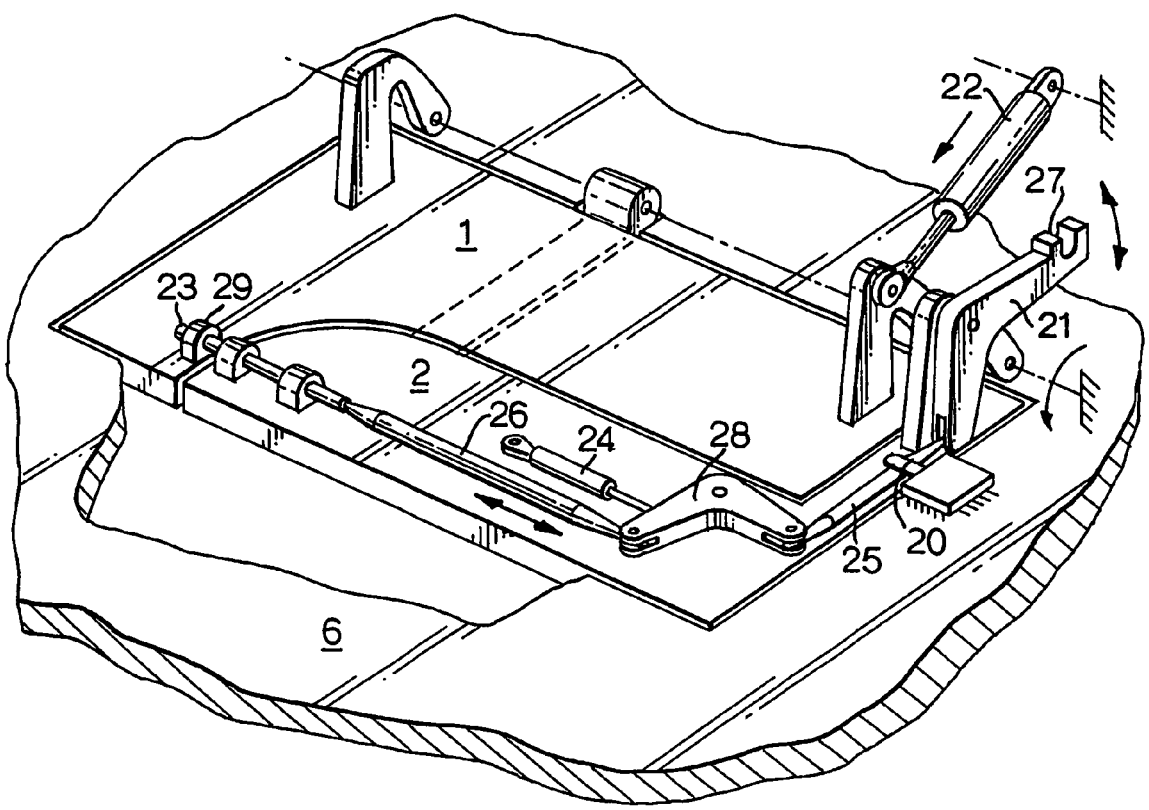
FIG. 6 is a perspective view of the assembly shown in FIG. 1 with part of the aircraft skin cut-away and showing mechanisms for opening and closing the doors.
Figure 7:
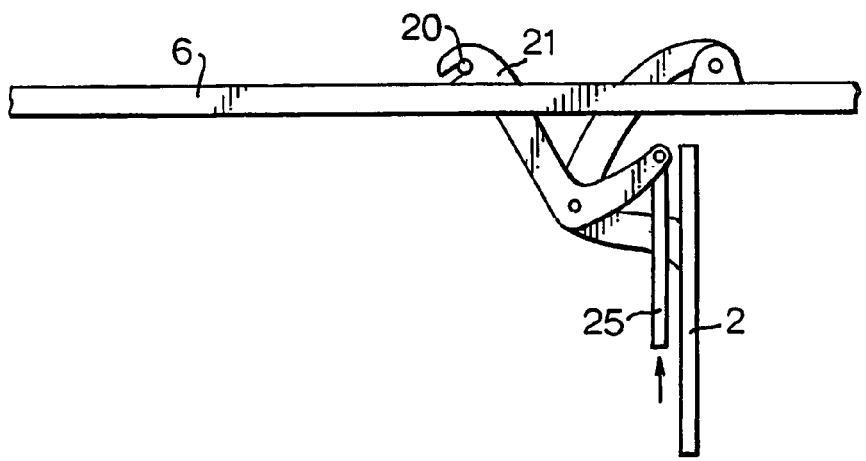
FIG. 7 is a partial sectional side view of the door assembly of FIG. 6 showing one of the doors in its open position.

Hydraulic actuators are provided for controlling movement of the doors, for controlling the locking of the doors in their closed positions and also for locking the second and fourth doors in their open positions. The hydraulic actuators and associated linkage mechanisms for open and closing the doors is shown in FIGS. 6 and 7. Those parts are generally not shown in FIGS. 1 to 3, although locks 15 for locking the doors in their closed positions and locks 17 for locking the doors 2 and 4 in their open positions are shown schematically in FIGS. 1 to 3 of the drawings, but not in FIGS. 6 and 7. Also, it may be noted that the particular mounting arrangement shown for each of the doors is different; it should be understood that any appropriate mounting arrangement that allows the doors to rotate as required may be adopted having regard to other features of the assembly.

The operation of the doors will now be described with reference to FIGS. 1 to 3, 6 and 7.

In the middle of a flight, the doors 1 to 4 will usually be in their closed positions as shown in FIG. 1, with the landing gear stowed in the landing gear bay within the aircraft fuselage or wing, above the closed doors.

Figure 2:
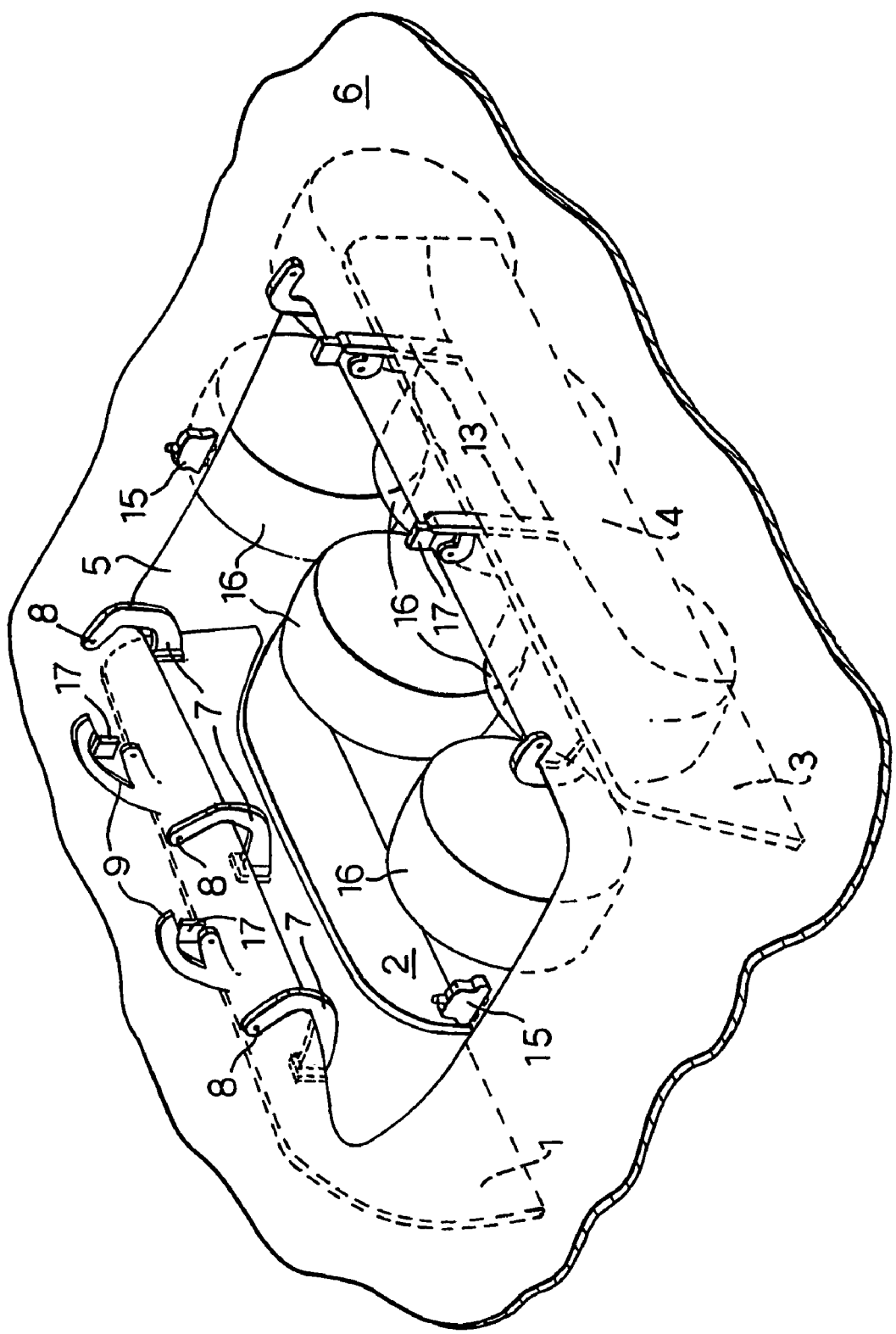
FIG. 2 is a perspective view similar to FIG. 1 but with the landing gear deployed and all the doors open.
Figure 3:
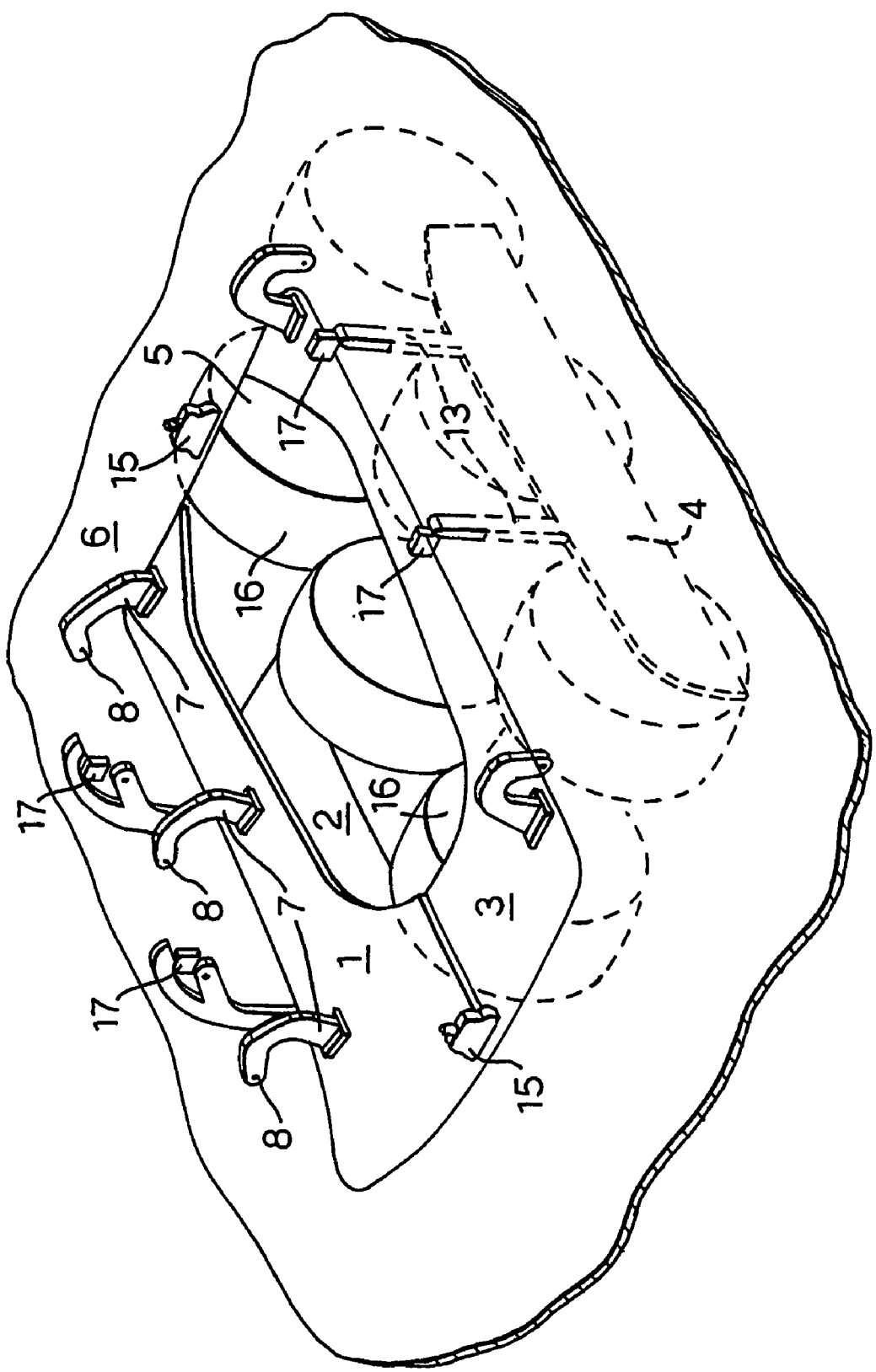
FIG. 3 is a perspective view similar to FIG. 2 with the landing gear deployed, but with some of the doors closed.

As the aircraft approaches a runway the landing gear needs to be deployed. To that end, all of the doors 1 to 4 are opened by rotating them through about 90 degrees to the position shown in FIG. 2, the first and second doors being moved together as a unit and the third and fourth doors being moved together as a unit. It is then possible to deploy the landing gear, with the whole of the aperture 5 open to allow the landing gear to pass through it. In FIGS. 2 and 3 wheels 16 of the landing gear are shown. When the landing gear is fully deployed the doors 2 and 4 lie adjacent to respective wheels 16.

Once the landing gear has been deployed the first door 1 and the third door 3 are closed. The landing gear and the doors 1 and 3 are arranged such that once the landing gear is fully deployed the doors 1 and 3 can be locked. This arrangement of the doors is shown in FIG. 3. With only the doors 2 and 4 remaining open the aerodynamic effect of the landing gear doors on the aircraft is significantly reduced and the noise generated by the doors is also reduced.

The doors 1 and 3 remain closed and the doors 2 and 4 remain open while the aircraft lands and, in due course, takes off again. After take off and while the landing gear is still deployed, the doors 1 and 3 are opened again returning the doors to the positions shown in FIG. 2. The landing gear is then retracted through the whole of the aperture 5 and, then, all of the doors 1 to 4 are closed.

Breakable couplings are provided between the doors to facilitate movement of the first and second doors together as a unit and movement of the third and fourth doors together as a unit. FIGS. 6 and 7 show schematically the breakable coupling mechanism and actuators in further detail. In the assembly shown in FIGS. 6 and 7, there is a coupling between the first door 1 and the second door 2 with an actuator 22 connected only to the first door 1, and similarly there is a coupling between the third door 3 and the fourth door 4. The doors are coupled together when they are all moved to their open positions of FIG. 2, they are then decoupled and the doors 1 and 3 then closed. Thereafter, the doors 1 and 3 are opened, the doors recoupled, and all the doors closed.

As shown in FIG. 6, the actuator 22 acts on the hinge of the first door 1. Rotatably mounted to the mid-point of the hinge of the second door 2 is a latching arm 21. One end of the arm 21 is provided with a recess 27 shaped to accommodate a peg 20, which is fixedly attached to the aircraft structure 6 surrounding the doors 1, 2. The other end of the arm 21 is connected, via a first connecting rod 25, to one arm of a rotable crank 28, the other arm of which being connected to a second connecting rod 26, which is connected to a locking pin 23. The crank 28 is connected to a remotely operable hydraulic actuator 24, that via crank 28 is able to cause translational movement to rods 25, 26 along their axes and therefore rotational movement of latching arm 21 and translational movement of locking pin 23. The actuator 24, arm 27, rods 25, 26, crank 28 and pin 23 are all mounted on the second door 2 (or on the hinge associated with the second door) and therefore rotate with the second door 2.

In FIG. 6 the second door 2 is shown coupled by means of locking pin 23 being inserted into a pin housing 29 mounted on the first door 1. When the actuator 22 is operated, both the doors 1, 2 move to the open position locked together by the locking pin 23. At the doors-open position, the actuator 24 may be operated, pulling back the locking pin 23 and, through connecting rods 25 and 26 and crank 28, pivoting the latching arm 21, the end 27 of which engages with the peg 20 (see FIG. 7, which shows the second door 2 in its open position). The second door 2 is now locked in the open position and the first door 1 is free to be moved back to the closed position by actuator 22. Furthermore, the second door 2 may be closed thereafter by moving the first door into alignment with the second door 2, moving the crank 28 (by means of the actuator 24) simultaneously to unlock the second door from its open position (by disconnecting the arm 21 and the peg 20) and to couple the second door to the first door (by means of inserting the locking pin 23 into the housing 29).

The breakable couplings and actuators shown schematically in FIGS. 6 and 7 are associated with the first and second doors 1, 2. It will be understood that similar means are provided in respect of the third and fourth doors 3, 4.

Figure 4:
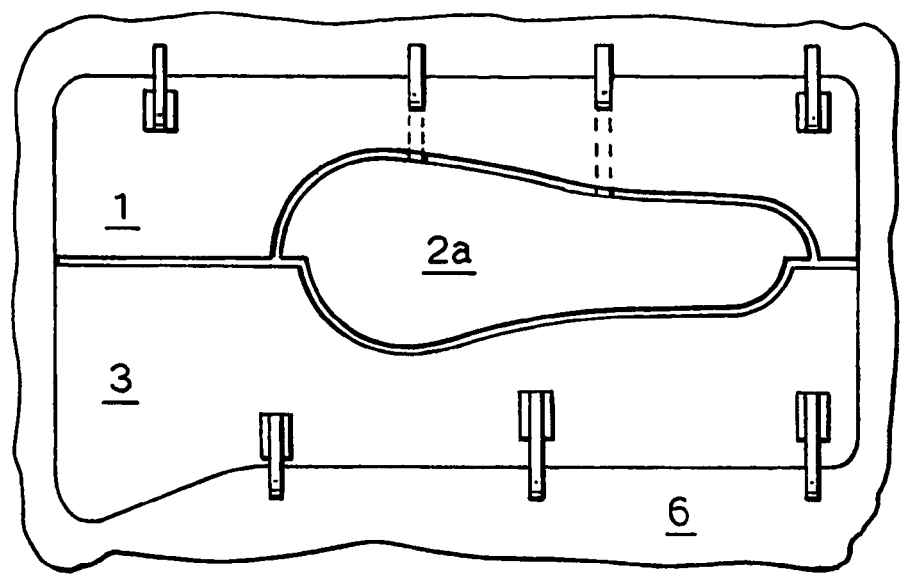
FIG. 4 is a plan view of a modified form of the landing gear door assembly shown in FIGS. 1 to 3 with all the doors shown closed.
Figure 5:
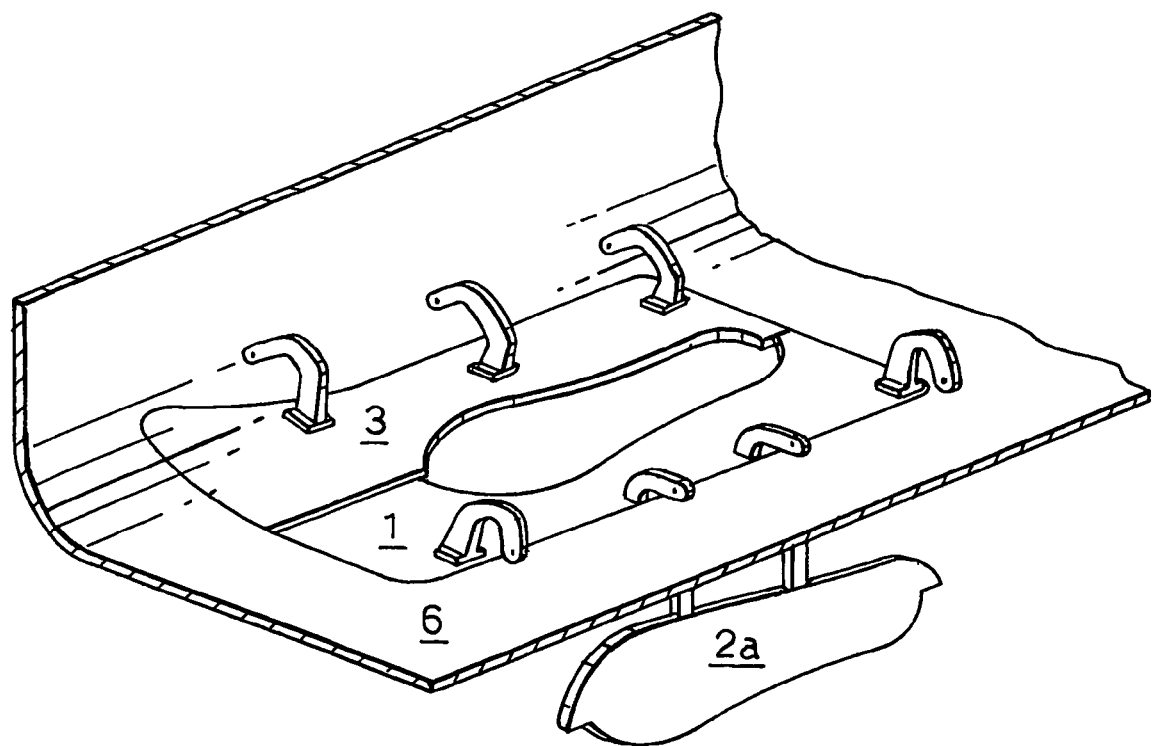
FIG. 5 is a perspective view of the modified form of landing gear shown in FIG. 4 with some of the doors closed.

FIGS. 4 and 5 illustrate schematically a modified design in which the second door 2 of the assembly shown in FIGS. 1 to 3 is replaced by a second door 2a and the fourth door 4 of the assembly shown in FIGS. 1 to 3 is omitted. The door 2a, when closed, is disposed between the doors 1 and 3 and the arrangement is approximately symmetrical about a vertical plane P (FIG. 4). The modified assembly of FIGS. 4 and 5 operates in substantially the same way as the assembly of FIGS. 1 to 3 with the door 2a moving in the same manner as the door 2 of the assembly described with reference to FIGS. 1 to 3. In FIG. 5 the wheels of the landing gear are not shown but it will be understood that the door 2a is disposed adjacent to the wheels, but that there is no corresponding door on the other side of the wheels.

The assembly of FIGS. 4 and 5 has the advantage that there is one less door to move and that only one door remains open after deployment of the landing gear, but has the disadvantage that the one door that does remain open has to be bigger and project further down in its open position, than if a pair of doors each of half the size were employed.

In the embodiment illustrated in FIGS. 1 to 3 and 6 and 7 described above, the doors are coupled so that a pair of doors may be moved by means of a single actuator. An alternative arrangement is to provide actuators so that each door is independently moved by its own hydraulic actuator.

The invention claimed is:

1. An aircraft landing gear door assembly comprising a plurality of doors moveable between open positions, in which a landing gear can be deployed through an aperture, and closed positions, in which the doors are closed across the aperture, the plurality of doors comprising a first door and a second door, wherein during at least part of said movement of the plurality of doors, the movement of at least the first door of the plurality of doors is independent of the movement of the landing gear, the first and second doors are so arranged that they are, when installed on an aircraft, configurable in such a way that movement of one of the first and second doors for at least a part of the way between the open and closed positions causes movement of the other of the first and second doors, and the first and second doors are arranged such that, when the landing gear is deployed, the second door is obstructed from moving between its open and closed positions while the first door is free to move between its open and closed positions.

2. An assembly according to claim 1, wherein the first and second doors are mounted such that they may be moved together between the open and closed positions substantially without any relative movement between the first and second doors.

3. An assembly according to claim 1, wherein one of the first and second doors is mounted for rotational movement about a fixed axis.

4. An assembly according to claim 1, wherein the first and second doors are mounted for rotation about a fixed axis, the fixed axes of rotation of the first and second doors being substantially coincident.

5. An assembly according to claim 1, wherein the first and second doom are each mounted for movement by means of a connection having a plurality of connection points, at least one of the connection points of one of the first and second doors being disposed between two of the connection points of the other of the first and second doors.

6. An assembly according to claim 1, in which the first and second doors are arranged so that they may be coupled together to move as a single unit between their open and closed positions, and be decoupled to enable the first door also to move independently of the second door between its open and closed positions.

7. An assembly according to claim 1, in which, when the doors are in their open positions, the second door is disposed below the first door.

8. An assembly according to claim 7, in which the second door is mounted on at least one arm, said at least one arm having one end and an other end, the at least one arm connected at one end to the second door and is moveably mounted at its other end to allow the movement of the second door between its open and closed positions.

9. An assembly according to claim 1, in which the plurality of doors further comprises a third door moveable between closed and open positions, the first and third doors defining a pair of doors on opposite sides of the aperture through which the landing gear is deployed.

10. An assembly according to claim 9, in which the third door is mounted for rotational movement about a fixed axis.

11. An assembly according to claim 9 in which the third door is arranged such that, when the landing gear is deployed, it is free to move between its open and closed positions.

12. An assembly according to claim 9, in which the plurality of doors includes a fourth door mounted for movement between closed and open positions, the third and fourth doors being arranged such that, when the landing gear is deployed, the fourth door is obstructed from moving between its open and closed positions while the third door is free to move between its open and closed positions.

13. An assembly according to claim 12, in which the fourth door is mounted for rotational movement about a fixed axis.

14. An assembly according to claim 13, in which the fixed axes of rotation of the third and fourth doors are substantially coincident.

15. An assembly according to claim 12, in which the third and fourth doors are arranged so that they may be coupled together to move as a single unit between their open and closed positions, and be decoupled to enable the third door also to move independently of the fourth door between its open and closed positions.

16. An assembly according to claim 12, in which, when the third and fourth doors are in their open positions, the fourth door is disposed below the third door.

17. An assembly according to claim 16, in which the fourth door is mounted on at least one arm which is connected at one end to the second door and is moveably mounted at its other end to allow the movement of the fourth door between its open and closed positions.

18. An aircraft landing gear door assembly comprising a plurality of doors moveable between open positions, in which a landing gear can be deployed through an aperture, and closed positions, in which the doors are closed across the aperture, the plurality of doors comprising a first door, a second door, a third door and a fourth door, wherein the first and second doors are so arranged that they are, when installed on an aircraft, configurable in such a way that movement of one of the first and second doors for at least a part of the way between the open and closed positions causes movement of the other of the first and second doors, the first and second doors are arranged such that, when the landing gear is deployed, the second door is obstructed from moving between its open and closed positions while the first door is free to move between its open and closed positions, the third and fourth doors are so arranged that they are, when installed on an aircraft, configurable in such a way that movement of one of the third and fourth doors for at least a part of the way between the open and closed positions causes movement of the other of the third and fourth doors, the third and fourth doors are arranged such that, when the landing gear is deployed, the fourth door is obstructed from moving between its open and closed positions while the third door is free to move between its open and closed positions, the first and third doors defining a first pair of doors on opposite sides of the aperture through which the landing gear is deployed, the second and fourth doors defining a second pair of doors on opposite sides of the aperture through which the landing gear is deployed.

19. An assembly according to claim 18, in which each of the first, second, third and fourth doors are mounted for rotational movement about a fixed axis, the fixed axes of rotation of the first and second doors being substantially coincident and the fixed axes of rotation of the third and fourth doors also being substantially coincident.

20. An aircraft including a landing gear door assembly according to claim 1 and the landing gear with which the landing gear door assembly is associated.

* * * * *